US006727602B2

United States Patent
Olson

(10) Patent No.: US 6,727,602 B2
(45) Date of Patent: Apr. 27, 2004

(54) POWER SUPPLY FOR CONTROLLED PARALLEL CHARGING AND DISCHARGING OF BATTERIES

(75) Inventor: Erlend Olson, Duarte, CA (US)

(73) Assignee: Broadcom Corporation, Irvine, CA (US)

( * ) Notice: Subject to any disclaimer, the term of this patent is extended or adjusted under 35 U.S.C. 154(b) by 146 days.

(21) Appl. No.: 10/058,070

(22) Filed: Jan. 29, 2002

(65) Prior Publication Data

US 2002/0117998 A1 Aug. 29, 2002

Related U.S. Application Data

(60) Provisional application No. 60/264,259, filed on Jan. 29, 2001.

(51) Int. Cl.[7] .......................... G05F 1/652; G05F 1/656
(52) U.S. Cl. .......................... 307/46; 307/60; 323/222
(58) Field of Search .................. 307/46, 60; 323/222

(56) References Cited

U.S. PATENT DOCUMENTS

| | | | |
|---|---|---|---|
| 4,602,203 A | | 7/1986 | Bragdon |
| 4,644,458 A | * | 2/1987 | Harafuji et al. ............... 363/65 |
| 4,823,247 A | * | 4/1989 | Tamoto ........................ 363/16 |
| 5,373,195 A | | 12/1994 | De Doncker et al. ......... 307/45 |
| 5,376,875 A | | 12/1994 | Yee et al. |
| 5,519,306 A | * | 5/1996 | Itoh et al. .................... 323/222 |
| 5,583,753 A | | 12/1996 | Takayama .................... 363/71 |
| 5,592,095 A | | 1/1997 | Meadows |
| 5,757,163 A | | 5/1998 | Brotto et al. |
| 6,034,514 A | * | 3/2000 | Sakai .......................... 323/225 |

FOREIGN PATENT DOCUMENTS

| EP | 0 012 315 | 6/1980 |
|---|---|---|
| WO | WO 00/21178 | 4/2000 |

OTHER PUBLICATIONS

Patent Abstacts of Japan, Publication No. 04160419, Jun. 3, 1992.
Patent Abstracts of Japan, Publication No. 10108381, Apr. 24, 1998.

(List continued on next page.)

Primary Examiner—Bao Q. Vu
(74) Attorney, Agent, or Firm—Sterner Kessler Goldstein & Fox P.L.L.C.

(57) ABSTRACT

A power supply and switching technique is provided that utilizes a first battery and a second battery to charge a load. The power supply includes a first controlled power switch coupled to the first battery and the load, a second controlled power switch coupled to the second battery and the load, and a power controller coupled to the first controlled power switch, the second controlled power switch, and the load. The power controller monitors the voltage and the load and causes a charge to be applied to the load when the load voltage is not a predetermined voltage. The power controller causes a charge to be applied to the load by selectively closing the first controlled power switch, thereby providing a charge from the first battery to the load, and/or selectively closing the second controlled power switch, thereby providing a charge from the second battery to the load. A similar switching technique may be used to recharge the first and second battery by alternately coupling them to an external power source.

17 Claims, 4 Drawing Sheets

OTHER PUBLICATIONS

Copy of International Search Report, issued Dec. 6, 2002, for Interantional Application No. PCT/US02/02368, 11 pages.

Linear Technology, "LTC 1960: Smallest and Fastest Dual Battery Charger With Crisis Management", Press Release—Aug. 2001, (2 pages), downloaded from http://www.linear.com.cn/pub/document.html?pub type=pr&document=320 on Aug. 13, 2002.

Linear Technology, "LTC 1960: Dual Battery Charger/Selector With SPI Interface," Initial Release, Final Electrical Specifications, Apr. 2001, (20 pages), downloaded from http://www.linear.com/prod/datasheet.html?datasheet=774 on Jan. 21, 2002.

Patent Abstracts of Japan, Publication No. 05316721, Nov. 26, 1993, 1 page.

Patent Abstracts of Japan, Publication No. 10243642, Sep. 11, 1998, 1 page.

Copy of International Search Report issued Sep. 9, 2002 for Appln. No. PCT/US02/02368, 6 pages.

* cited by examiner

POWER SUPPLY FOR CONTROLLED PARALLEL CHARGING AND DISCHARGING OF BATTERIES

CROSS-REFERENCE TO RELATED APPLICATIONS

This application claims priority to the following provisional application, which is incorporated by reference in its entirety herein: U.S. patent application Ser. No. 60/264,259, entitled "Battery-Operated Power Supply," filed Jan. 29, 2001, by Olson (now abandoned).

BACKGROUND OF THE INVENTION

1. Field of the Invention

The present invention relates to a system and method for operating a power supply. More specifically, the present invention relates to a system and method for utilizing battery power sources in an electronic power supply.

2. Background

Conventional electronic power supplies that operate using battery power sources suffer from a number of disadvantages.

For example, a conventional method for providing a DC voltage to a DC—DC converter utilizes two or more batteries in a series configuration. Often, when batteries are configured serially, one battery will become depleted well in advance of the others. This is due, in part, to varying internal series resistances as well as other characteristics that may cause each battery to discharge at a different rate. Where one battery dies in advance of the others in a series configuration, no power can be delivered to the device being powered.

Recharging batteries that are in series can also be problematic. Because the batteries in a stack typically discharge at different rates, the voltage in each battery before recharging will be different. If one of the batteries in series has been severely discharged to the point where gas has started to build on the anode or cathode, that battery can actually reverse polarity. When an attempt is made to recharge the batteries, the battery with a reverse polarity will, in effect, be charged in reverse. This will result in the death of that battery, which means that no power can be delivered to the device being powered as discussed above. Additionally, it has been observed that charging a battery with a reverse polarity can actually cause the battery to be damaged or heat up to the point where it will explode.

Furthermore, when batteries are arranged in series, it is difficult to monitor how much charge is in each of them. Because batteries are manufactured with slight differences, each individual battery will charge and discharge at a different rate. It would be useful to know for discharging and recharging purposes how much charge remains in each battery in a battery pack. In a conventional series arrangement, the overall voltage coming out of a battery pack may be detected, but it is impossible to determine the state of one of the cells in the middle of the stack.

Conventional schemes for operating two or more battery cells in parallel are also disadvantageous in that they require the addition of external parts to add multiple cells to a battery pack, which can be complex and costly. Moreover, conventional techniques for operating cells in parallel do not avoid the problem of over-discharging, or "deep" discharging of a battery that can result in polarity reversal.

A further disadvantage of conventional battery-operated power supplies is that they utilize separate power control chips that must be coupled to the application to be powered using external logic and parts. This makes the design more expensive. Furthermore, because these separate power control chips are not "on chip" with the application being powered, they do not have access to a priori information about impending load changes. Thus, conventional battery-operated power supplies require large load capacitors to act as charge buffers to prevent sudden load changes from pulling a supply voltage out of specification (in the case where a large load is suddenly presented) or from causing the supply voltage to spike too high (in the case where the load current is suddenly turned off).

Conventional battery-operated power supplies also do not monitor the state of batteries by determining how much charge is in them, but instead simply look at the voltage on the battery. Although the voltage on the battery provides an indication of the state of the battery, that information is not as useful as tracking how much charge remains in the battery.

Conventional battery-operated power supplies are also disadvantageous in that they typically utilize a Schottky diode to discharge current into a load. Because a Schottky diode has a typical turn-on voltage of about 0.4 to 0.6 volts, the use of the diode will result in an energy loss equal to the turn-on voltage times the load current. This is lost energy that could have otherwise been used by the load. Where only one or two small batteries are being used, this loss can be quite significant. The use of Schottky diodes is also problematic because it is impossible to control their turn-on and turn-off characteristics beyond their manufactured values.

BRIEF SUMMARY OF THE INVENTION

There is a great need for innovative techniques that would enable portable electronic equipment to operate more efficiently from battery power sources. For example, in the Bluetooth™ area of wireless products, it is anticipated that there will be great demand for Bluetooth™-compatible headsets. High efficiency and small size are essential to the success of any Bluetooth™ headset. A battery-operated power supply is used to power the headset at the correct voltage from rechargeable batteries.

The present invention provides a system and method for drawing charge from two or more batteries under the control of a power controller, wherein the power controller may control and monitor the amount and rate of discharge. The present invention may also be used to recharge two or more batteries under the control of a power controller, wherein the power controller may control and monitor the amount and rate of charging. In an embodiment, the present invention may be used to provide power to a DC to DC converter and to recharge batteries used for providing power to a DC to DC converter.

The present invention is advantageous in that it provides a separate connection to each battery for charging and recharging purposes. As a result, the depletion of any single cell in a battery pack will not result in a complete loss of power to the application being powered, as charge may be drawn from any of the other cells that have not yet been depleted. In fact, the power controller of the present invention may be used to increase the power drawn from the surviving cells to compensate for the loss of the depleted battery.

Because embodiments of the present invention provide a separate connection to each battery, the state of each battery may be monitored on an individual basis. As a result, each cell can be charged and discharged in an optimal way. For example, polarity reversal may be avoided by tracking the amount of charge that has been drawn off of each battery in the battery pack. Additionally, discharging and recharging may be evenly applied to each cell. Optimal charging and discharging of each battery will permit the battery to last through more charge/discharge cycles, hold more power before needing charging, and be far more reliable than batteries in conventional power supplies.

Also, because each battery may be monitored on an individual basis, embodiments of the present invention also permit information to be provided to the user about the state of each battery, such as a warning when a battery's charge is low or when a battery is depleted.

In an embodiment of the present invention, the state of each battery is monitored by utilizing counters that maintain a continuous running total of how long the battery has been charged or discharged. This information, in turn, may be used to determine the precise amount of charge remaining in each battery. This technique represents an improvement over conventional power supply circuits, in which the status of a battery or batteries is determined simply by looking at the voltage of a battery or batteries.

The present invention is also advantageous in that it permits the addition of multiple cells in a battery pack with a very minimal external parts count, while still keeping the cells separate so that charging can be optimized and so that the depletion of individual cells dying in the battery pack will not cause a loss of power to the entire product. As a result, embodiments of the present invention may be implemented in an easy and inexpensive manner.

Another benefit of the present invention is that it may be implemented very efficiently on-chip along with an application circuit being powered. For example, an embodiment of the present invention is implemented on-chip with an application circuit in CMOS. Since an embodiment of the present invention may be implemented in digital CMOS, digital logic may be easily added to the power controller that will allow fine tuning of the rate of charge/discharge of a given battery in light of battery condition and load demands.

Also, since embodiments of the present invention may be implemented on-chip with the application circuit being powered, the application circuit can provide useful information to the power controller to help control the power supply. For example, the application circuit can provide the power controller with a priori information about an impending load change. This may occur, for instance, where the application circuit is going from a standby state to an active state, or vice-versa. The access to information regarding impending load changes permits the power controller to control the power supply to increase or decrease the power supply accordingly in advance of the change. As a result, embodiments of the present invention do not require the large load capacitors of conventional designs that act as charge buffers which compensate for large and sudden load changes.

Additionally, embodiments of the present invention use a controlled FET to discharge current into a load, and thus avoid the energy loss associated with conventional designs that use a Schottky diode to perform that function. This is due to the fact that a FET may have a drain-to-source voltage that is significantly lower than the turn-on voltage of a Schottky diode. For example, a FET with a drain-to-source voltage of 10 mV may be used as compared to a Schottky diode with a typical turn-on voltage of 0.4 to 0.6 V. Furthermore, the use of a FET in embodiments of the present invention permits precise control of turn-off and turn-on voltages as opposed to Schottky diodes, in which the turn-on and turn-off voltages cannot be modified after manufacture.

Additional features and advantages of the invention will be set forth in the description that follows, and in part will be apparent from the description, or may be learned by practice of the invention. The objectives and other advantages of the invention will be realized and attained by the system and method particularly pointed out in the written description and claims hereof as well as the appended drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
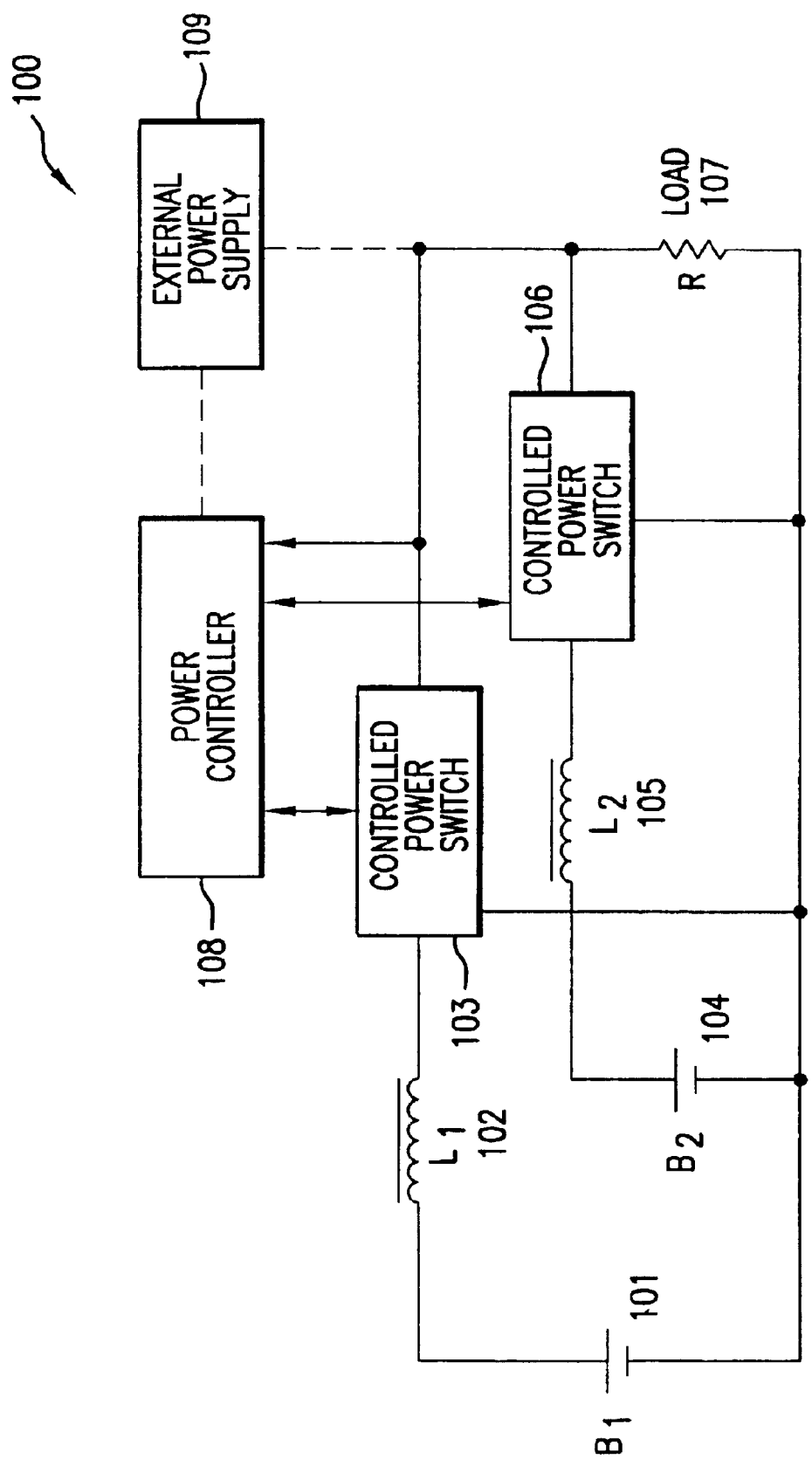
FIG. 1 is a functional block diagram of a battery-operated power supply in accordance with an embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

FIG. 1 depicts a functional block diagram of a battery-operated power supply 100 in accordance with an embodiment of the present invention. Power supply 100 includes a first battery 101 (designated "$B_1$"), a first inductor 102 (designated "$L_1$"), a second battery 104 (designated "$B_2$"), a second inductor 105 (designated "$L_2$"), a load 107, a power controller 108, a first controlled power switch 103, a second controlled power switch 106, and an optional external power supply 109. In embodiments, the power supply 100 generates the necessary power to operate a connected application device or circuit, which is represented schematically as load 107. In other words, the power supply 100 is designed to make sure that the battery voltage provided by the first and second batteries 101 and 104 is matched to the voltage of the circuit in which those batteries are employed.

Each battery 101 and 104 is separately coupled to the load 107 via the first and second controlled power switches 103 and 106, respectively. When the first controlled power switch 103 is open, charge from the first battery 101 accumulates on the first inductor 102, and when the first controlled power switch 103 is closed, charge is delivered from the first battery 101 to the load 107. In a like fashion, when the second controlled power switch 106 is open, charge from the second battery 104 accumulates on the second inductor 104, and when the second controlled power switch 106 is closed, charge is delivered from the second battery 104 to the load 107.

The opening and closing of the controlled power switches is selectively controlled by the power controller 108. The power controller 108 is responsible for maintaining the necessary operating voltage across load 107. To do so, the power controller 108 determines what the actual voltage is across the load 107, to which it is connected. If the voltage across the load 107 is less than the voltage necessary for powering the application device or circuit, the power controller 108 operates to increase the charge delivered from the first battery 101 and/or the second battery 104. If the voltage across the load 107 is more than required for powering the application device or circuit, the power controller 108 operates to decrease the charge delivered from the first battery 101 and/or the second battery 104.

The power controller 108 increases the charge delivered from the first battery 101 by increasing the amount of time that the first controlled power switch 103 is closed and decreases the charge delivered from the first battery 101 by increasing the amount of time that the first controlled power switch 103 is open. Similarly, the power controller 108 increases the charge delivered from the second battery 104 by increasing the amount of time that the second controlled power switch 106 is closed and decreases the charge delivered from the second battery 104 by increasing the amount of time that the second controlled power switch 106 is open.

In embodiments, the controlled power switches 103 and 106 may be open and closed in an alternating fashion by the power controller 108, so that charge is delivered from only one battery at a time. Alternately, the controlled power switches 103 and 106 may be closed at the same time, so that power is delivered from both batteries at once. In further embodiments, the power controller 108 may control the controlled power switches 103 and 106 to discharge in an alternating fashion as well as simultaneously.

The design depicted in FIG. 1 is advantageous in that it provides a separate connection between each battery 101 and 104 to the load 107 for discharging purposes. As a result, the depletion of either battery 101 and 104, in and of itself, will not result in a complete loss of power to the application device or circuit being powered, as represented by the load 107. In embodiments, the power controller 108 increases the discharge rate from the surviving battery to compensate for the loss of the depleted battery.

Furthermore, because the design depicted in FIG. 1 provides a separate connection between each battery 101 and 104 and the load 107, the state of each battery 101 and 104 can be monitored on an individual basis. For example, polarity reversal may be avoided by tracking the amount of charge that has been drawn off of the first battery 101 and the second battery 102. Additionally, the power controller 108 can operate to ensure that discharging occurs evenly as between battery 101 and 104.

The design shown in FIG. 1 can also be utilized to implement a recharging technique for the power supply 100. As shown in FIG. 1, the power supply 108 also includes an optional external power supply 109 which may be used to recharge the first battery 101 and the second battery 104. In an embodiment, charge from the external power supply 109 may be selectively applied to each battery 101 and 104 via operation of the controlled power switches 103 and 106, respectively. In such an embodiment, when the first controlled power switch 103 is open, no charge from the external power supply 109 will be supplied to the first battery 101, and when the first controlled power switch 103 is closed, charge from the external power supply 109 is delivered to the first battery 101. In a like fashion, when the second controlled power switch 106 is open, no charge from the external power supply will be supplied to the second battery 104, and when the second controlled power switch 106 is closed, charge from the external power supply 109 will be delivered to the second battery 104.

As discussed above, the opening and closing of the controlled power switches is selectively controlled by the power controller 108. In a recharging scheme, the power controller 108 is responsible for providing enough charge to the first and second batteries 101 and 104 so that they will remain sufficiently charged to power a connected application device or circuit. To do so, the power controller 108 determines how much charge remains in each battery. If one of the batteries requires recharging, the power controller 108 operates to increase the charge delivered to that battery. Alternately, if a battery is sufficiently recharged, the power controller 108 operates to decrease or stop the charge being delivered to that battery.

In a recharging scheme, the power controller 108 increases the charge delivered to the first battery 101 from the external power supply 109 by increasing the amount of time that the first controlled power switch 103 is closed and decreases the charge delivered to the first battery 101 from the external power supply 109 by increasing the amount of time that the first controlled power switch 103 is open. Similarly, in a recharging scheme, the power controller 108 increases the charge delivered to the second battery 104 from the external power supply 109 by increasing the amount of time that the second controlled power switch 106 is closed and decreases the charge delivered to the second battery 104 from the external power supply 109 by increasing the amount of time that the second controlled power switch 106 is open.

As discussed above, the state of each battery 101 and 104 may be monitored on an individual basis by the power controller 108. As a result, the power controller 108 can control the rate and amount of recharging of each battery by the external supply 109 such that each battery is recharged in an optimal way. For example, the power controller 108 can operate to ensure that recharging is even applied to batteries 101 and 104.

The power supply 100 of FIG. 1 utilizes only two batteries 101 and 104. However, as will be appreciated by persons of ordinary skill in the relevant art(s) from the teachings provided herein, the discharging and recharging techniques discussed herein may be applied in a power supply with only one battery, with two batteries, or with more than two batteries. For example, the power supply 100 of FIG. 1 could be modified to include an additional battery in parallel with the first battery 101 and the second battery 104 by adding an additional inductor and controlled power switch. The present invention includes such alternate embodiments.

Figure 2:
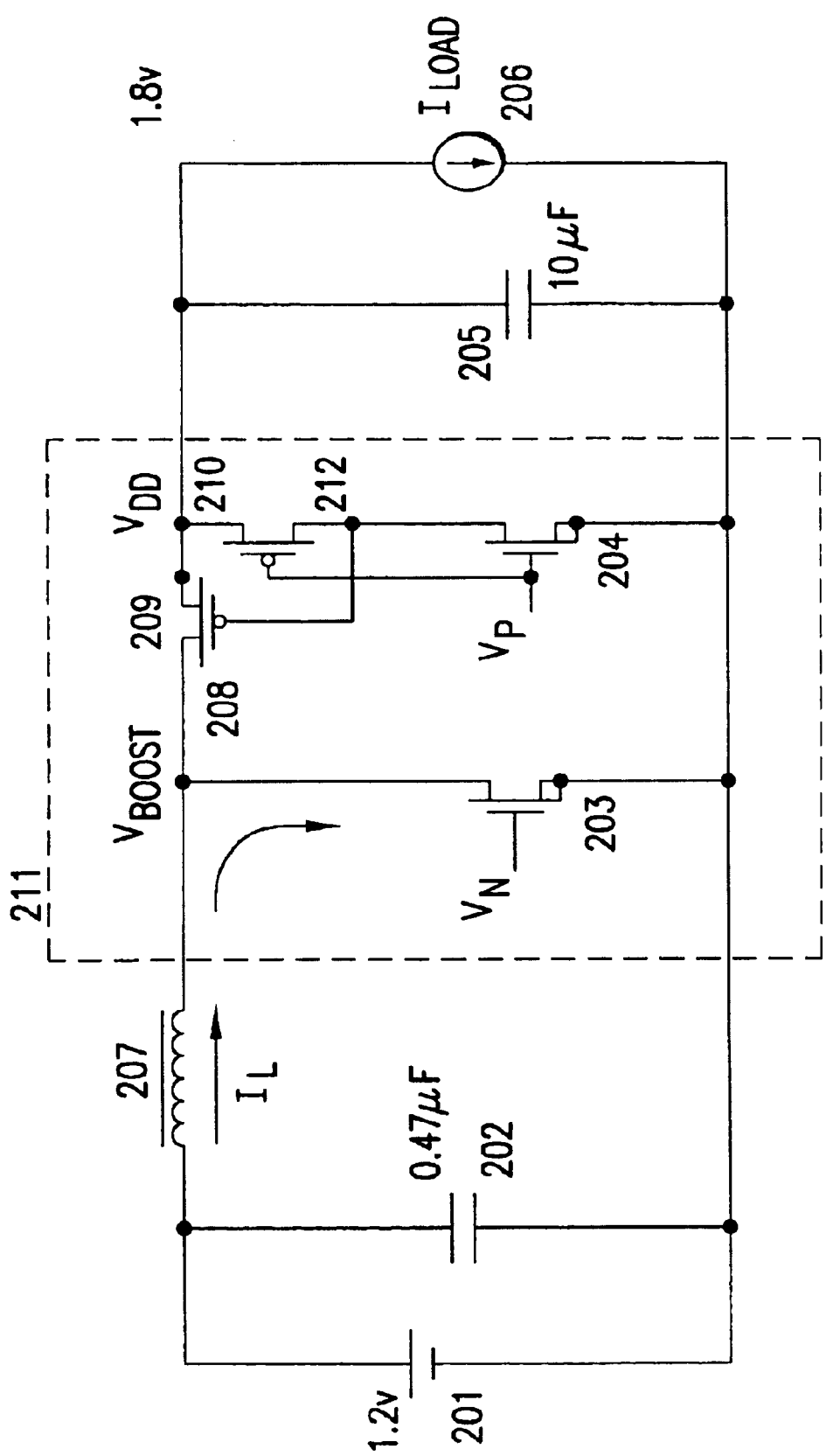
FIG. 2 is a high-level schematic of a battery-operated power supply circuit in accordance with embodiments of the present invention.

FIG. 2 illustrates a high-level schematic of a battery-operated power supply circuit 200 in accordance with embodiments of the present invention. The power supply circuit 200 includes a battery 201, a shunt capacitor 202, an inductor 207, a controlled power switch 211, a load capacitor 205 and a load 206. The load 206 represents an application device or circuit to which the power supply circuit 200 is connected and for which the power supply circuit 200 provides operating power. In the embodiment shown in FIG. 2, the battery 201 is a 1.2 volt battery and the load 206 is 1.8 volts. In embodiments, the battery 201 may comprise a nickel cadmium (NiCd) battery or a nickel-metal hydride battery.

In the power supply circuit 200, the battery 201 and the inductor 207 are analogous to either the first battery 101 and the first inductor 102 or the second battery 104 and the second inductor 105 of the power supply 100 of FIG. 1. The load 206 is analogous to the load 107 of the power supply 100 of FIG. 1. Finally, the controlled power switch 211 is analogous to either of the controlled power switches 103 and 106 of the power supply 100 of FIG. 1.

In the embodiment shown in FIG. 2, the controlled power switch 211 includes a first transistor 203, a second transistor 204, a third transistor 209, a fourth transistor 212, a $V_{BOOST}$ node 208, and a $V_{DD}$ node 210. In embodiments, the transistors 203, 204, 209 and 212 are implemented as FETs.

The power supply 200 provides charge from the battery 201 to the load 206 via the operation of the controlled power switch 211. The operation of the controlled power switch 211 is, in turn, controlled by the application of control signal $V_N$ to the first transistor 203 and application of control signal $V_P$ to the second transistor 204 and the fourth transistor 212. The technique by which the control signals $V_N$ and $V_P$ are generated will be discussed in more detail below in regard to FIG. 3.

Figure 4:
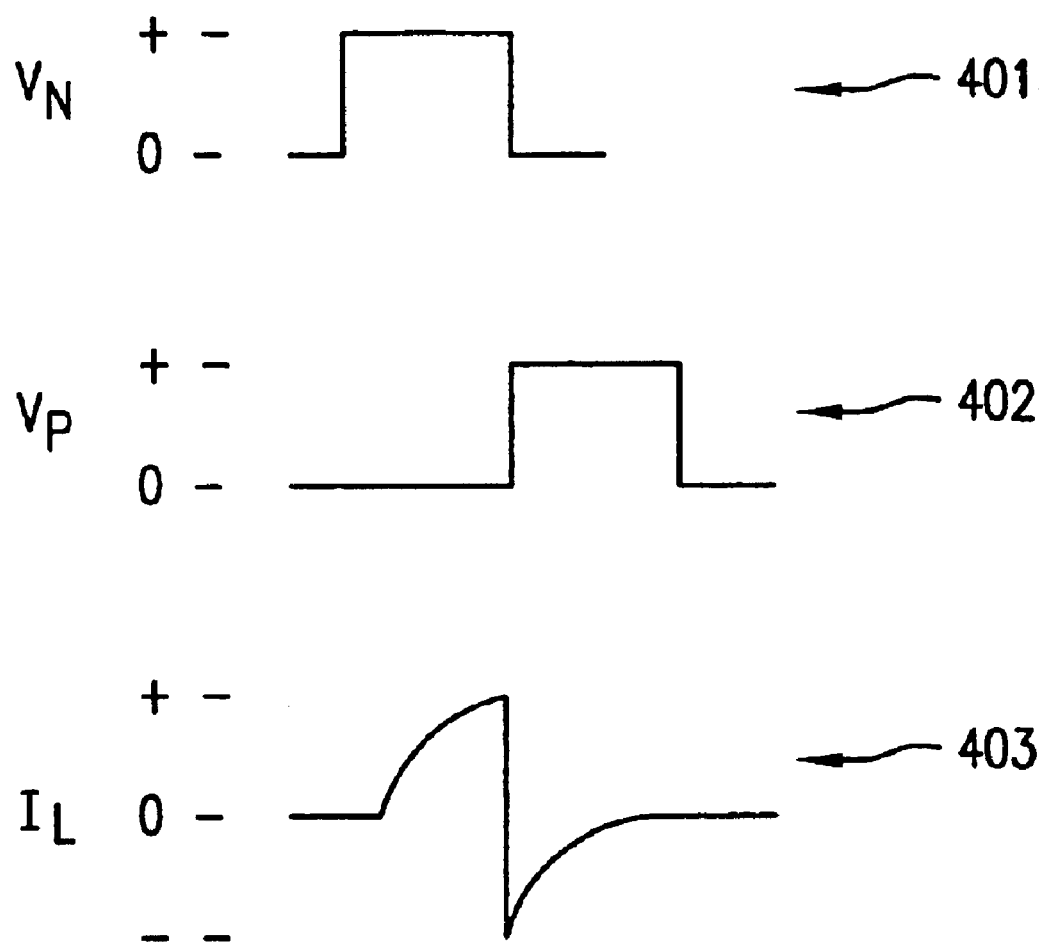
FIG. 4 depicts exemplary voltages and charge values for components of a battery-operated power supply circuit in accordance with an embodiment of the present invention.

In the controlled power switch 211, when the control signal $V_N$ applied to the first transistor 203 goes high, a charge $I_L$ is permitted to build up on the inductor 207. This is depicted, for example, in FIG. 4, which shows the control signal $V_N$ as signal 401 and the charge $I_L$ on the inductor 207 as signal 403. As can be seen in FIG. 4, when $V_N$ goes high, a charge $I_L$ builds up on the inductor 207.

When the control signal $V_P$ applied to the second transistor 204 and the fourth transistor 212 subsequently goes high, the charge $I_L$ on the inductor 207 is provided to the load 206. This is depicted, for example, in FIG. 4, which shows the control signal $V_P$ as signal 402 and the charge $I_L$ on the inductor 207 as signal 403. As can be seen in FIG. 4, when $V_P$ goes high, the charge $I_L$ on the inductor 207 is discharged to the load 206.

The use of third transistor 209 as opposed to a Schottky diode for controlling discharge into the load represents an improvement over conventional power supplies. This is due to the fact that the third transistor 209 may have a drain-to-source voltage that is significantly lower than the turn-on voltage of a Schottky diode. For example, the third transistor 209 may be implemented as a FET with a drain-to-source voltage of 10 mV as compared to a Schottky diode that has a typical turn-on voltage of 0.4 to 0.6 V. Because a Schottky diode has a typical turn-on voltage of about 0.4 to 0.6 volts, the use of the diode will result in an energy loss equal to the turn-on voltage times the load current. This is lost energy that could have otherwise been used by the load. Furthermore, the use of the third transistor 209 in embodiments of the present invention permits precise control of turn-off and turn-on voltages as opposed to Schottky diodes, in which the turn-on and turn-off voltages cannot be modified after manufacture.

The voltage $V_{BOOST}$ that accumulates on node 208 indicates the current voltage level of the battery. In embodiments, the voltage at $V_{BOOST}$ may be used to monitor the state of the battery 201 and to ensure that the battery 201 has not been completely discharged or entered into a state of reverse polarity. For example, the power controller 108 of the power supply 100 of FIG. 1 could monitor the voltage $V_{BOOST}$.

The voltage $V_{DD}$ that appears at node 210 of power supply circuit 200 indicates the voltage across the load 206 (the "load voltage").

In the power supply circuit 200, the shunt capacitor 202 is provided in parallel with the battery 201 to act as a shunt in case there is any inductive "back-kick" onto the battery, as will be understood by those skilled in the art. Additionally, the load capacitor 205 is provided in parallel with the load 206 to act as a charge buffer in the instance of sudden load changes. As is further discussed herein, embodiments of the present invention permit the use of a very small load capacitor (e.g., 10 μF) as compared to the load capacitors used in conventional power supply circuits.

The power supply circuit 200 of FIG. 2 is shown using only one battery 201. However, as will be appreciated by persons of ordinary skill in the relevant art(s) from the teachings provided herein, the power supply circuit 200 of FIG. 2 could be modified to use two or more batteries. For example, this could be achieved by connecting an identical configuration of shunt capacitor 202, inductor 207, controlled power switch 211, and load capacitor 205 in parallel to the load 206 for each battery to be added.

Figure 3:
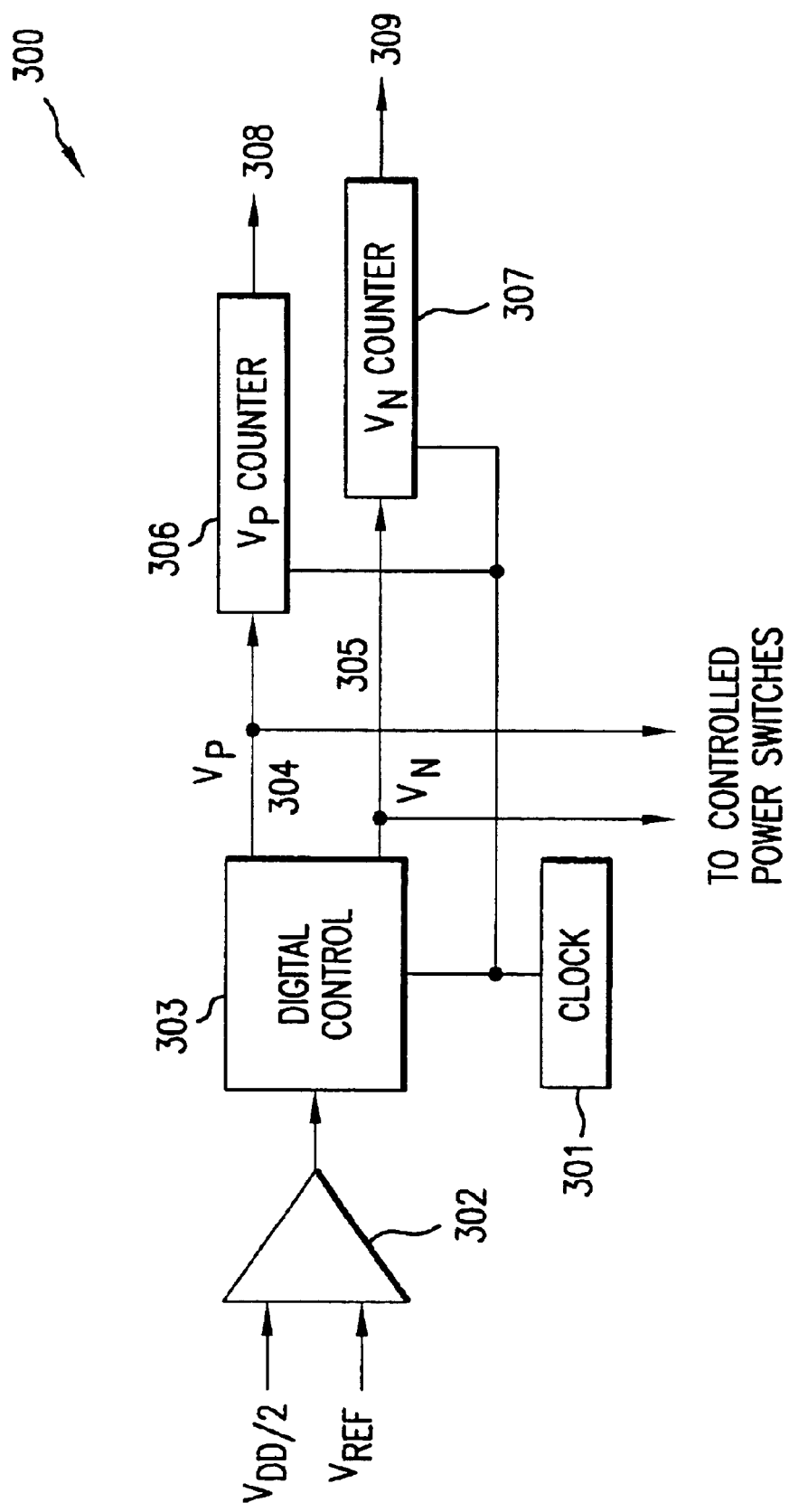
FIG. 3 is a functional block diagram of a power control circuit used in a battery-operated power supply in accordance with an embodiment of the present invention.

FIG. 3 is a functional block diagram of a power control circuit 300 that comprises a part of a power controller used in a power supply in accordance with an embodiment of the present invention. The power control circuit 300 monitors the load voltage and controls the operation of a controlled power switch in power supply circuit embodiments of the present invention. For example, the power control circuit 300 may be used to control the operation of the controlled power switch 211 in the power supply circuit 200 of FIG. 2. Also, in an embodiment, the power control circuit 300 of FIG. 3 may comprise part of the power controller 108 of FIG. 1.

The power control circuit 300 includes a clock 301, a comparator 302, a digital control module 303, a $V_P$ counter 306, and a $V_N$ counter 307. In an embodiment, the components of the power control circuit 300 are entirely implemented as digital components. For example, the components of the power control circuit 300 may be implemented in digital CMOS.

The comparator 302 is used by the power control circuit 300 to determine if the voltage across the load, $V_{DD}$, is sufficient to power the attached application circuit or device. In the power control circuit 300, the comparator makes this determination by comparing $V_{DD}/2$ to a reference voltage, $V_{REF}$, that is equal to the desired operating voltage divided by 2. The input $V_{DD}/2$ may be generated by running the output voltage $V_{DD}$ through a simple resistor divider network or a capacitor divider network. The reference voltage $V_{REF}$ may be obtained by a bandgap reference circuit or other circuit known to persons skilled in the art for generating reference voltages. As an example, in the power supply circuit 200 of FIG. 2, the desired operating voltage is 1.8 volts. Therefore, an appropriate value for $V_{REF}$ would be 0.9 volts.

By comparing the load voltage $V_{DD}$ to the reference voltage $V_{REF}$, the comparator 302 provides an indication to the digital control module 303 of whether the load voltage $V_{DD}$ is above or below the desired level. In response, the digital control module 303 uses this information to generate control signals $V_P$ and $V_N$ in a manner that will either increase or decrease the amount of charge delivered to the load in order to achieve the desired voltage level.

As will be appreciated by persons skilled in the art, a wide variety of comparators 302 may be used to monitor the level of the load voltage $V_{DD}$. Additionally, more than one comparator may be used. For example, in an embodiment, one window comparator could be used to determine if $V_{DD}$ is very close to the desired level, so that only minor modifications to the control signals $V_P$ and $V_N$ need be made, while an additional two comparators could be used to determine if $V_{DD}$ is much further away from the desired level, such that greater modifications to the control signals $V_P$ and $V_N$ need be made.

In a further embodiment, the clock 301 is used to provide timing information to the digital control module 303, and a determination is made as to how long the load voltage $V_{DD}$ has been above or below the desired supply level. The digital control module 303 then modifies the controls signals $V_P$ and $V_N$ accordingly, so that the load voltage $V_{DD}$ will be increased or decreased in greater proportion depending on how long $V_{DD}$ has been away from the desired supply.

The digital control module 303 generates the control signals $V_P$ and $V_N$ that control the operation of a controlled power switch in a power supply in accordance with embodiments of the present invention. For example, the digital control module 303 may generate the control signals $V_P$ and $V_N$ that control the operation of the controlled power switch 211 in the power supply 200 of FIG. 2.

In an embodiment, the control signals $V_P$ and $V_N$ each comprise a series of pulses of a fixed pulse width and the digital control module 303 controls the frequency of the pulses for each signal. In other words, the digital control module 303 controls the number of intervals between pulses in the signals $V_P$ and $V_N$. By increasing the frequency of the pulses, the digital control module 303 can increase the amount of time that the controlled power switch discharges the battery into the load. Alternately, by decreasing the frequency of the pulses, the digital control module 303 can decrease the amount of time that the controlled power switch discharges the battery into the load. For example, in order to pull charge out of the battery only 50% of the time, the digital control module 303 will generate $V_P$ and $V_N$ signals in which every pulse is followed by a time off equal to the pulse width. As a further example, if only 25% discharging is required, the digital control module 303 will generate $V_P$ and $V_N$ signals in which every pulse is followed by a time off equal to three pulse widths.

In order to generate the control signals $V_P$ and $V_N$ at a fixed frequency the digital control module 303 uses the clock 301 as a reference. In embodiments, the clock 301 operates at 12 MHz. In a further embodiment, the digital control module 303 generates the control signals $V_P$ and $V_N$ at the same frequency in order to avoid creating harmonics in the power supply circuit that may interfere with a connected application device or circuit.

Persons skilled in the relevant art will appreciate that the digital control module 303 may implement other algorithms for generating the control signals $V_P$, $V_N$ in order to increase or decrease the amount of time that the controlled power switch discharges the battery into the load. For example, in an alternate embodiment, the digital control module 303 can alter the pulse width of the control signals $V_P$ and $V_N$ in order to increase or decrease the amount of time that the controlled power switch discharges the battery into the load. The present invention is directed to such other algorithms.

In an embodiment, the power control circuit 300 is implemented on the same chip as the application circuit energized by the power supply. For example, the power control circuit 300 may be implemented along with the application circuit in digital CMOS. In an implementation of this type, the application circuit may provide the digital control module 303 with a priori information about an impending load change. For example, the application circuit may provide the digital control module 303 with information about an impending increase or decrease in the load. When the digital control module 303 receives this advanced information about the application circuit, it can adjust the control signals $V_P$ and $V_N$ accordingly to increase or decrease the output voltage $V_{DD}$. Because the digital control module can receive advance information about load changes from the application circuit, a power supply using the power controller does not require a large capacitor in parallel with the load to act as a charge buffer for dealing with sudden load changes.

In the power control circuit 300, the $V_P$ counter 306 accumulates information about the control signal $V_P$, including how long $V_P$ has been turned on. Similarly, the $V_N$ counter 307 accumulates information about the control signal $V_N$, including how long $V_N$ has been turned on. The counters 306 and 307 scale this information with appropriate scaling factors (such as factors relating to the size of the inductor and load capacitor attached to the controlled power switch controlled by the control signals $V_N$ and $V_P$) to determine precisely how much charge has been removed from the battery whose discharge is controlled by the control signals $V_N$ and $V_P$.

The counters 308 and 309 can thus report the status of the battery to the user via an LED or other display. For example, the counters 308 and 309 may provide a warning to the user when a battery's charge is low or when a battery is depleted. In an alternate embodiment, the counters 308 and 309 provide information about the status of the battery to the digital controller 303, which can use the information to determine whether to modify the control signals $V_N$ and $V_P$.

For example, in an instance where the counters 308 and 309 determine that the battery is close to depletion or has been completely discharged, the digital control module 303 can turn off $V_N$ and $V_P$ to ensure that no more charge is removed from the battery.

In embodiments, the counter 306 and 307 are implemented as simple digital counters controlled by the clock 301.

It will be appreciated by persons of ordinary skill in the art from the teachings provided herein that the power control circuit 300 of FIG. 3 may also be used to implement a battery recharging scheme. In recharging embodiments of the present invention, the power control circuit 300 is used to monitor the state of a battery (as opposed to monitoring a load voltage) and to generate control signals $V_N$ and $V_P$ to control the amount and rate of charge provided to the battery (as opposed to the load). The invention is directed to such recharging schemes.

In an embodiment, a system using a battery-operated power supply of the type described herein can provide new and useful configurations for products. For example, a system such as a headset can be built in modules. The headset could comprise two pieces: a basic monaural version (single headphone) with the electronics and a battery built in, and a second headphone for stereo use. If a user wants to use the headset as a stereo headset, he can attach the second headphone, which has its own battery. Stereo mode would require more power and the second headphone would provide that power. Configuring the power supply to operate off of any number of cells or batteries in parallel, as described herein, provides a new level of flexibility in product design and configuration, which is difficult to do with batteries running in series. A system can be made in modules, each with its own battery, which can be placed in parallel with the batteries in other modules. A power controller, such as the power controller 108 described in reference to FIG. 1, can then provide balancing of the available power from the plurality of batteries to match the plurality of loads.

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A power supply for providing charge to a load from a first battery and a second battery, comprising:

a first power switch coupled to the first battery and the load;

a second power switch coupled to the second battery and the load; and a power controller coupled to said first power switch, said second power switch, and the load, said power controller providing charge from the first battery to the load by closing said first power switch and providing charge from the second battery to the load by closing said second power switch;

wherein said power controller monitors a load voltage on the load and causes an increased charge to be supplied to the load when said load voltage is less than a predetermined voltage by increasing the amount of time that at least one of said first power switch or said second power switch is closed, and wherein said power controller controls said first and second power switch to open and close in an alternating fashion, thereby supplying charge to the load from only one battery at a time.

2. A power supply for providing charge to a load from a first battery and a second battery, comprising:

a first power switch coupled to the first battery and the load;

a second power switch coupled to the second battery and the load; and a power controller coupled to said first power switch, said second power switch, and the load, said power controller providing charge from the first battery to the load by closing said first power switch and providing charge from the second battery to the load by closing said second power switch;

wherein said power controller monitors a load voltage on the load and causes an increased charge to be supplied to the load when said load voltage is less than a predetermined voltage by increasing the amount of time that at least one of said first power switch or said second power switch is closed, and wherein said power controller determines an amount of charge that has been supplied from the first and second batteries.

3. The power supply of claim 2, wherein said power controller further comprises:

a plurality of counters adapted to determine an amount of time said first power switch has been closed and an amount of time said second power switch has been closed;

wherein said power controller determines an amount of charge that has been supplied from the first battery based on said amount of time said first power switch has been closed and determines an amount of charge that has been supplied from the second battery based on said amount of time said second power switch has been closed.

4. The power supply of claim 2, wherein said power controller controls the opening and closing of said first and second power switch to ensure that the discharging of the first battery and the second battery occurs at an equal rate.

5. The power supply of claim 2, wherein said power controller stops supplying charge to the load from the first battery when the first battery is depleted and stops supplying charge to the load from the second battery when the second battery is depleted.

6. The power supply of claim 2, wherein said power controller increases the amount of charge supplied to the load from the first battery when the second battery is depleted and increases the amount of charge supplied to the load from the second battery when the first battery is depleted.

7. The power supply of claim 2, wherein said power supply further comprises:

a display;

wherein said display is adapted to provide information to a user about the amount of charge remaining in the first and second batteries.

8. A power supply for providing a charge to a first battery and a second battery from a charge source, comprising:

a first power switch coupled to the first battery and the charge source;

a second power switch coupled to the second battery and the charge source; and a power controller coupled to said first power switch and said second power switch, said power controller selectively providing a charge from the charge source to either the first battery or the second battery by closing said first power switch or said second power switch, respectively.

9. A power supply for providing a charge to a first battery and a second battery from a charge source, comprising:

a first power switch coupled to the first battery and the charge source;

a second power switch coupled to the second battery and the charge source; and a power controller coupled to said first power switch and said second power switch, said power controller providing charge from the charge source to the first battery by closing said first power switch and providing charge from the charge source to the second battery by closing said second power switch;

wherein said power controller determines an amount of charge remaining in the first and second battery and causes an increased charge to be supplied to the first battery when said charge remaining on the first battery falls below a first predetermined level by increasing an amount of time that said first power switch is closed and causes an increased charge to be supplied to the second battery when said charge remaining on the second battery falls below a second predetermined level by increasing an amount of time that said second power switch is closed.

10. A power supply for supplying charge to a load from a plurality of batteries, comprising:

a plurality of power switches, wherein each of said plurality of power switches is coupled to one of the plurality of batteries and to the load; and a power controller coupled to said plurality of power switches;

wherein said power controller controls each of said plurality of power switches to regulate the amount of charge supplied to the load from a corresponding one of the plurality of batteries, and wherein said power controller further comprises: a plurality of counters that track an amount of charge provided by each of the plurality of batteries.

11. A power supply for supplying charge to a load from a plurality of batteries, comprising:

a plurality of power switches, wherein each of said plurality of power switches is coupled to one of the plurality of batteries and to the load; and a power controller coupled to said plurality of power switches;

wherein said power controller controls each of said plurality of power switches to regulate the amount of charge supplied to the load from a corresponding one of the plurality of batteries, and wherein the power-supply power supply is implemented on the same chip as the load.

12. A power supply for supplying charge to a plurality of batteries from a charge source, comprising:

a plurality of power switches, wherein each of the plurality of power switches is coupled to the charge source and to one of the plurality of batteries; and a power controller coupled to said plurality of controlled power switches;

wherein said power controller controls said power switches to regulate the amount of charge supplied to the plurality of batteries from the charge source.

13. A method for supplying charge to a load from a plurality of batteries, comprising the steps of:

monitoring a load voltage across the load;

comparing said load voltage to a predetermined voltage;

selecting one of the plurality of batteries;

controlling a switch to permit a charge to flow from said selected battery to the load for a time interval when said load voltage is less than said predetermined voltage.

14. The method of claim 13, further comprising the step of:

determining the amount of charge provided by said selected battery.

15. The method of claim 13, further comprising the step of:

determining the amount of charge sent to the load by said selected battery.

16. The method of claim 13, wherein said controlling step further comprises:

storing a charge from said selected battery in an inductor; and releasing said stored charge from said inductor to the load.

17. A method for supplying charge to a load from a plurality of batteries, comprising the steps of:

monitoring a load voltage across the load;

comparing said load voltage to a predetermined voltage;

selecting one of the plurality of batteries;

controlling a switch to permit a quantity of charge to flow from said selected battery to the load when said load voltage is less than said predetermined voltage.

* * * * *

UNITED STATES PATENT AND TRADEMARK OFFICE
CERTIFICATE OF CORRECTION

PATENT NO. : 6,727,602 B2
DATED : April 27, 2004
INVENTOR(S) : Erlend Olson

It is certified that error appears in the above-identified patent and that said Letters Patent is hereby corrected as shown below:

Column 13,
Line 45, the colon after "comprises" should be deleted.

Column 14,
Line 6, "power-supply" should be deleted.

Signed and Sealed this

Twelfth Day of April, 2005

JON W. DUDAS
*Director of the United States Patent and Trademark Office*